United States Patent
Jeon et al.

(10) Patent No.: US 12,236,208 B2
(45) Date of Patent: Feb. 25, 2025

(54) INTEGRATED CIRCUIT FOR CONSTANT MULTIPLICATION AND DEVICE INCLUDING THE SAME

(71) Applicant: Samsung Electronics Co., Ltd., Suwon-si (KR)

(72) Inventors: Hyoungjun Jeon, Seongnam-si (KR); Sanghyuck Ha, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 589 days.

(21) Appl. No.: 17/358,812

(22) Filed: Jun. 25, 2021

(65) Prior Publication Data

US 2022/0171602 A1    Jun. 2, 2022

(30) Foreign Application Priority Data

Dec. 2, 2020 (KR) .......................... 10-2020-0166966

(51) Int. Cl.
*G06F 7/523* (2006.01)
*G06F 1/03* (2006.01)

(52) U.S. Cl.
CPC ................ *G06F 7/523* (2013.01); *G06F 1/03* (2013.01)

(58) Field of Classification Search
CPC ... G06F 7/523; G06F 1/03; G06F 7/50; G06F 7/5443; G06F 1/035; G06F 1/0356; G06F 7/5235; G06F 7/533; G06F 7/5334; G06F 7/5336; G06F 7/5338
See application file for complete search history.

(56) References Cited

U.S. PATENT DOCUMENTS

| | | | | |
|---|---|---|---|---|
| 4,864,529 A | * | 9/1989 | Shah | G06F 7/5334 708/630 |
| 6,279,097 B1 | * | 8/2001 | Kaku | H04L 45/745 711/216 |
| 7,046,723 B2 | * | 5/2006 | Schier | H03H 17/0226 708/316 |

(Continued)

FOREIGN PATENT DOCUMENTS

KR    10-2020-0095163 A    8/2020

OTHER PUBLICATIONS

Booth, Andrew D., "A Signed Binary Multiplication Technique," Quarterly Journal of Mechanics and Applied Mathematics, vol. IV, Pt. 2 (1951) (Year: 1951).*

(Continued)

*Primary Examiner* — Matthew D Sandifer
(74) *Attorney, Agent, or Firm* — HARNESS, DICKEY & PIERCE, P.L.C.

(57) ABSTRACT

An integrated circuit for generating a product of an input and a constant includes a lookup table memory configured to store seeds corresponding to multiples of the constant, processing circuitry configured to generate a plurality of addresses respectively corresponding to a plurality of parts extracted from the input, configured to receive a plurality of seeds from the lookup table memory based on the plurality of addresses, and configured to generate a plurality of partial products based on the plurality of seeds. The processing circuitry is configured to sum the plurality of partial products. A number of the plurality of seeds stored in the lookup table memory is less than a number of possible values of the plurality of partial products.

20 Claims, 18 Drawing Sheets

(56) References Cited

U.S. PATENT DOCUMENTS

| | | | | |
|---|---|---|---|---|
| 7,296,049 | B2* | 11/2007 | Hojsted | G06F 7/5336 708/625 |
| 7,536,429 | B2* | 5/2009 | Hubert | G06F 7/5334 708/491 |
| 8,248,337 | B2* | 8/2012 | Takeuchi | H04N 9/646 345/530 |
| 2005/0125480 | A1* | 6/2005 | Yeh | H04N 19/427 708/620 |
| 2013/0159367 | A1* | 6/2013 | Dubrovin | G06F 7/5336 708/209 |
| 2019/0042939 | A1 | 2/2019 | Langhammer et al. | |
| 2019/0115922 | A1 | 4/2019 | Zhang et al. | |
| 2019/0325309 | A1 | 10/2019 | Flamant | |
| 2020/0058356 | A1 | 2/2020 | Tran et al. | |
| 2020/0073636 | A1 | 3/2020 | Cammarota et al. | |
| 2020/0097823 | A1 | 3/2020 | Chen et al. | |
| 2020/0272479 | A1 | 8/2020 | Jiang et al. | |

OTHER PUBLICATIONS

Meher, Pramod Kumar. "New approach to LUT implementation and accumulation for memory-based multiplication." 2009 IEEE International Symposium on Circuits and Systems. IEEE, 2009. (Year: 2009).*

* cited by examiner

| IN[k+3:k] | PP | Operation |
|---|---|---|
| 0000 | 0 | 0 |
| 0001 | C | C |
| 0010 | 2C | C<<1 |
| 0011 | 3C | 3C |
| 0100 | 4C | C<<2 |
| 0101 | 5C | 5C |
| 0110 | 6C | 3C<<1 |
| 0111 | 7C | 7C |
| 1000 | 8C | C<<3 |
| 1001 | 9C | 9C |
| 1010 | 10C | 5C<<1 |
| 1011 | 11C | 11C |
| 1100 | 12C | 3C<<2 |
| 1101 | 13C | 13C |
| 1110 | 14C | 7C<<1 |
| 1111 | 15C | 15C |

| IN[k+3:k] | PP | Operation |
|---|---|---|
| 0000 | 0 | 0 |
| 0001 | C | C |
| 0010 | 2C | C<<1 |
| 0011 | 3C | 3C |
| 0100 | 4C | C<<2 |
| 0101 | 5C | 3C + C<<1 |
| 0110 | 6C | 3C<<1 |
| 0111 | 7C | 3C<<1 + C |
| 1000 | 8C | C<<3 |
| 1001 | 9C | C<<3 + C |
| 1010 | 10C | 3C<<1 + C<<2 |
| 1011 | 11C | 3C<<2 − C |
| 1100 | 12C | 3C<<2 |
| 1101 | 13C | 3C<<2 + C |
| 1110 | 14C | 3C<<2 + C<<1 |
| 1111 | 15C | C<<4 − C |

▨ : SD

INTEGRATED CIRCUIT FOR CONSTANT MULTIPLICATION AND DEVICE INCLUDING THE SAME

CROSS-REFERENCE TO RELATED APPLICATION

This application is based on and claims priority under 35 U.S.C. § 119 to Korean Patent Application No. 10-2020-0166966, filed on Dec. 2, 2020, in the Korean Intellectual Property Office, the disclosure of which is incorporated by reference herein in its entirety.

BACKGROUND

Inventive concepts relate to multiplication, and more particularly, to an integrated circuit for constant multiplication and/or a device including the same.

In a device for processing a digital signal, multiplication for calculating a product of a multiplicand and a multiplier may occur frequently. For example, numerous multiply-accumulate (MAC) operations may occur in a device designed that executes a machine learning model. For a more accurate result, it may be important to process an input of multiplication having an increased size (e.g., the number of bits), for example, the multiplicand and/or the multiplier, at a low cost and high speed.

SUMMARY

Inventive concepts relates to multiplication, and more particularly, to an integrated circuit for constant multiplication having a high performance and efficiency at the same time and a device including the same.

According to some example embodiments of inventive concepts, there is provided an integrated circuit for generating a product of an input and a constant including a lookup table memory configured to store seeds corresponding to multiples of the constant, processing circuitry configured to generate a plurality of addresses respectively corresponding to a plurality of parts extracted from the input, configured to receive a plurality of seeds from the lookup table memory based on the plurality of addresses, and configured to generate a plurality of partial products based on the plurality of seeds. The processing circuitry is configured to sum the plurality of partial products. A number of the plurality of seeds stored in the lookup table memory is less than a number of possible values of the plurality of partial products.

According to some example embodiments of inventive concepts, there is provided a device including a plurality of cells configured to generate, in parallel, products of inputs and weights, the weights included in a feature map. Each of the plurality of cells includes a lookup table memory configured to store seeds corresponding to multiples of a weight, processing circuitry configured to generate an address corresponding to a part extracted from an input, and to generate a partial product based on a seed corresponding to the address, and the processing circuitry is configured to sum a plurality of partial products. A number of the seeds stored in the lookup table memory is less than a number of possible values of the partial product.

According to some example embodiments of inventive concepts, there is provided a method of generating a product of an input and a constant including extracting a plurality of parts from the input, generating a plurality of addresses respectively corresponding to the plurality of parts, obtaining a plurality of seeds from a lookup table memory storing seeds corresponding to multiples of the constant, the obtaining based on the plurality of addresses, generating a plurality of partial products based on the plurality of seeds, and summing the plurality of partial products. A number of seeds stored in the lookup table memory is less than a number of possible values of the plurality of partial products.

BRIEF DESCRIPTION OF THE DRAWINGS

Some example embodiments of inventive concepts will be more clearly understood from the following detailed description taken in conjunction with the accompanying drawings in which:

FIG. 3 is a block diagram illustrating an integrated circuit according to some example embodiments and FIG. 4 is a diagram illustrating a table including partial products generated by the integrated circuit of FIG. 3 according to some example embodiments;

FIG. 5 is a block diagram illustrating an integrated circuit according to some example embodiments and FIG. 6 is a diagram illustrating a table including partial products generated by the integrated circuit of FIG. 5 according to some example embodiments;

DETAILED DESCRIPTION OF SOME EXAMPLE EMBODIMENTS

Figure 1:
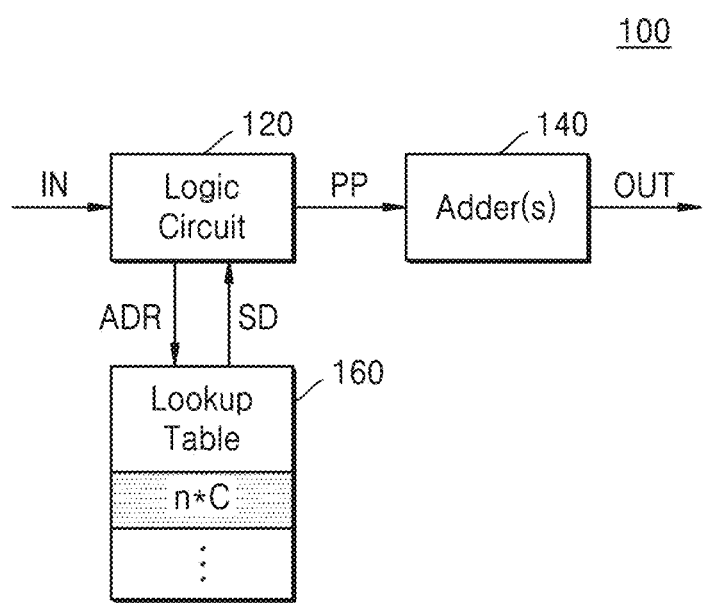
FIG. 1 is a block diagram illustrating an integrated circuit according to some example embodiments.

FIG. 1 is a block diagram illustrating an integrated circuit 100 according to some example embodiments. In more detail, the block diagram of FIG. 1 shows a part of the integrated circuit 100 that performs constant multiplication to generate an output OUT by multiplying an input IN by a constant. The input IN and the output OUT may be or correspond to multi-bit signals, and may be signed or unsigned. Herein, it is assumed that the input IN, the output OUT, and the constant are unsigned values, but example embodiments are not limited thereto. As shown in FIG. 1, the integrated circuit 100 may include a logic circuit 120, at least one adder 140, and a lookup table 160. In some example embodiments, the integrated circuit 100 may be manufactured/fabricated through a semiconductor process, and the logic circuit 120, the at least one adder 140, and the lookup table 160 may be integrated into a single die/single chip or may be respectively integrated into two or more dies/multiple chips. The logic circuit 120 and the at least one adder 140 may be collectively referred to as a processing circuitry.

For a more accurate result, the size of the input IN (e.g., the number of bits) may increase. For example, in a machine learning model for identifying a feature from an image, the size of the input image may increase, and/or the number of quantization levels for application to a mobile system may increase for a high accuracy. In order to process the increased size of the input IN, there may be an exponentially increasing cost/exponentially increasing complexity scaling in the multiplier. For example, when the number of bits of the input IN increases 2 times from 8 to 16, four 8-bit multipliers may be required, and/or a multiplier may be required to perform 8-bit multiplications four times. As will be described later with reference to the drawings, the integrated circuit 100 may have more efficient structures for constant multiplication, thereby providing a high speed and/or low cost multiplication and/or improved scalability. Alternatively or additionally, due to the high performance and high efficiency multiplication, like an inference of a neural network and/or calculations in a proof-of-work based blockchain, both performance and efficiency of operations based on multiple multiplications may be improved. Alternatively or additionally, due to a machine learning model (e.g., a neural network) providing improved performance and efficiency, applications based on machine learning may be widely used in a mobile system. Alternatively or additionally, applications based on a blockchain may be more widely used.

Referring to FIG. 1, the logic circuit 120 may receive the input IN and may access the lookup table 160. For example, as shown in FIG. 1, the logic circuit 120 may provide an address ADR to the lookup table 160 and receive a seed SD from the lookup table 160. The logic circuit 120 may generate a partial product PP based on the seed SD received from the lookup table 160. In some example embodiments, as will be described later with reference to FIG. 2 and the like, the logic circuit 120 may extract a plurality of parts from the input IN, and provide a plurality of addresses to the lookup table 160, thereby receiving a plurality of seeds from the lookup table, and generating a plurality of partial products based on the plurality of seeds. Herein, the parts extracted from the input IN may be referred to as input parts. An example of the logic circuit 120 will be described later with reference to FIG. 2 and the like.

The at least one adder 140 may receive the partial product PP from the logic circuit 120 and may generate the output OUT based on the partial product PP. For example, as will be described later with reference to FIG. 2 and the like, the at least one adder 140 may receive a plurality of partial products from the logic circuit 120, and generate the output OUT by summing (adding) the plurality of partial products. Herein, the at least one adder 140 summing the partial products may be referred to as at least one first adder.

The lookup table memory/the lookup table 160 may be accessed by the logic circuit 120 and may store seeds corresponding to multiples of a constant C multiplied by the input IN. The constant C may be an integer, e.g. may be an integer greater than or equal to zero; however, example embodiments are not limited thereto. For example, as shown in FIG. 1, when n is an integer, the lookup table 160 may store 'n*C' as a seed. The logic circuit 120 may generate the address ADR based on a value of the part extracted from the input IN, and may generate/more easily generate a partial product based on a seed corresponding to the address ADR. Accordingly, the product of the input IN and the constant C, for example, the output OUT, may be more efficiently calculated. In some example embodiments, when the integrated circuit 100 is used in a machine learning model that identifies features from the input image, and the size of the input image increases from, e.g., 513×513 to 4023×3024, the size of the feature map of the neural network increases from 150 MB to 6.2 GB, whereas the size of a weight may increase from about 20 MB to 30 MB. Accordingly, even if the size of the input IN increases, an increase in the size of the lookup table 160 storing multiples of the weight/multiples of a constant, may be limited. Alternatively or additionally, as will be described later with reference to the drawings, the lookup table 160 may store only some of all possible values of the partial product, for example, all possible multiples of the constant. For example, the number of seeds stored in the lookup table 160 may be less than the number of possible values of the partial product, and accordingly, the lookup table 160 may have a reduced size. For example, the number of seeds stored in the lookup table 160 may be half the number of possible values of the partial product, or may be less than half the number of possible values of the partial product.

The lookup table 160 may have any structure storing seeds. For example, the lookup table 160 may be or may include a volatile memory such as at least one of a static random access memory (SRAM), dynamic random access memory (DRAM), etc., and/or may be or may include a non-volatile memory such as flash memory, resistive random access memory (RRAM), etc., a one-time programmable (OTP) memory, an array of antifuses and/or of fuses, and a storage device such as at least one of a register, a flip-flop, etc.

Figure 2:
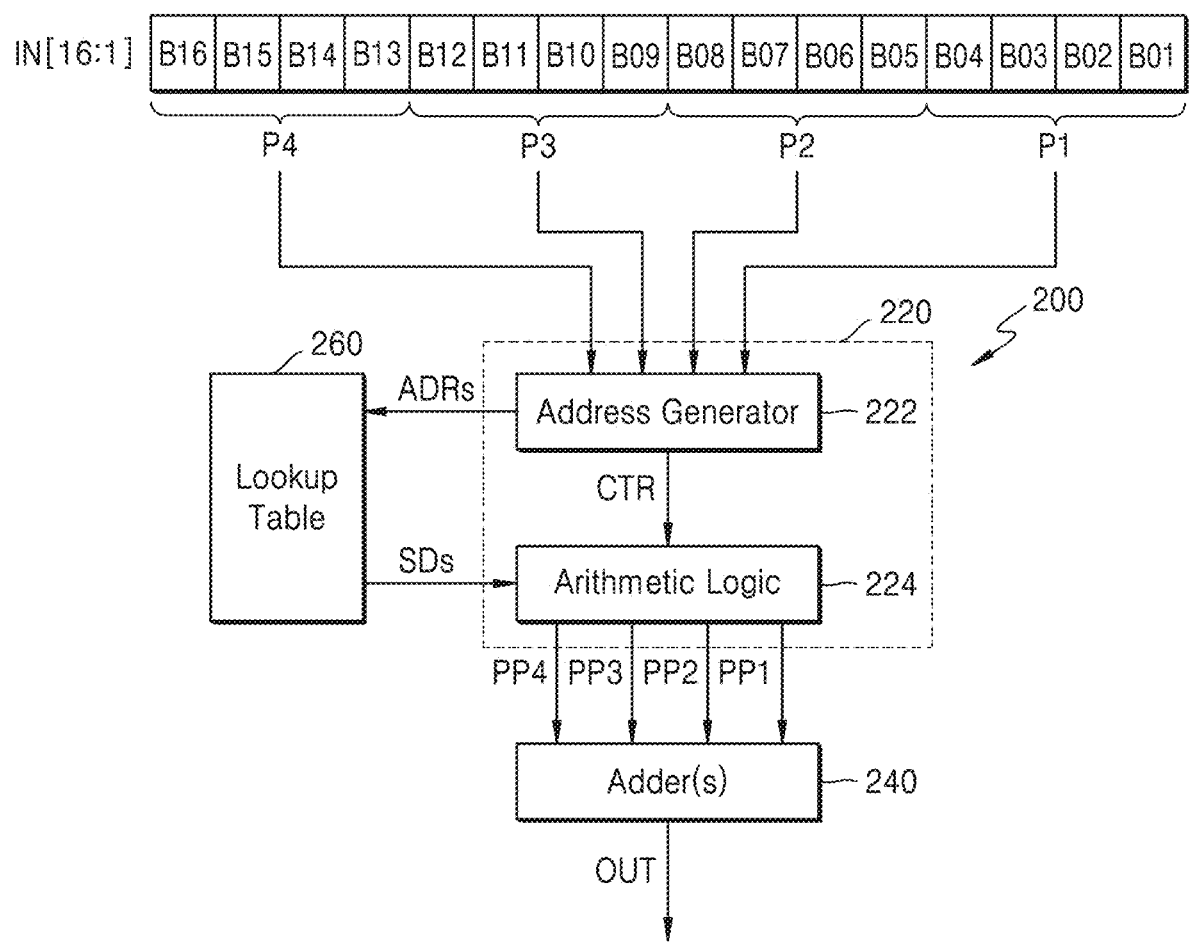
FIG. 2 is a block diagram illustrating an example of an integrated circuit according to some example embodiments.

FIG. 2 is a block diagram illustrating an example of an integrated circuit 200 according to some example embodiments. In more detail, the block diagram of FIG. 2 shows the integrated circuit 200 that generates the output OUT by multiplying a 16-bit input IN[16:1] by a constant. Similar to the integrated circuit 100 of FIG. 1, the integrated circuit 200 of FIG. 2 may include a logic circuit 220, at least one adder 240, and a lookup table 260.

The logic circuit 220 may include an address generator 222 and an arithmetic logic 224. The address generator 222 may receive the 16-bit input IN[16:1] and may generate the address ADR and a control signal CTR. The address generator 222 may extract a plurality of parts from the 16-bit input IN[16:1]. For example, as shown in FIG. 2, the address generator 222 may extract first to fourth parts P1 to P4 from the 16-bit input IN[16:1], and each of the first to fourth parts P1 to P4 may have a length of four (4) bits. In some example embodiments, as will be described later with reference to FIG. 9, the address generator 222 may extract a part that shares at least one bit with another part from the 16-bit input IN[16:1]. Although FIG. 2 illustrates that the input IN[16:1] is divided into four (4) equal parts of four (4) bits in length each, example embodiments are not limited thereto. For example, the input IN[16:1] may be divided into unequal parts, and/or may be divided into less than four (4) or more than four (4) parts.

The address generator 222 may generate a plurality of addresses ADRs and the control signal CTR based on the first to fourth parts P1 to P4 extracted from the 16-bit input IN [16:1]. In some example embodiments, the address generator 222 may generate at least one address from one part. In some example embodiments, the address generator 222 may not generate an address when the part extracted from the 16-bit input IN [16:1] is zero. The lookup table 260 may provide a plurality of seeds SDs respectively corresponding to the plurality of addresses ADRs to the logic circuit 220. In some example embodiments, the plurality of addresses ADRs may be simultaneously provided to the lookup table 260 in parallel, and the plurality of seeds SDs may also be provided to the logic circuit 220 in parallel and simultaneously. In addition, in some example embodiments, the plurality of addresses ADRs may be sequentially provided to the lookup table 260, and the plurality of seeds SDs may also be sequentially provided to the logic circuit 220.

The arithmetic logic 224 may receive the control signal CTR from the address generator 222 and may receive the plurality of seeds SDs from the lookup table 260. The arithmetic logic 224 may be referred to as or may correspond to an arithmetic logic unit (ALU), and may perform an arithmetic operation and/or a bit shift operation based on the control signal CTR, thereby generating first to fourth partial products PP1 to PP4 from the plurality of seeds SDs. Herein, the arithmetic operation and the bit shift operation may be collectively referred to as an operation. Also, the bit shift operation may simply be referred to as a shift, and may refer to a shift left. In some example embodiments, the first to fourth partial products PP1 to PP4 may respectively correspond to values obtained by multiplying the first to fourth parts P1 to P4 extracted from the 16-bit input IN[16:1] by a constant, e.g. by the same constant. Examples of the arithmetic logic 224 will be described later with reference to FIGS. 3, 5, 7, and 9 and the like.

The at least one adder 240 may generate the output OUT by summing the first to fourth partial products PP1 to PP4. In some example embodiments, the arithmetic logic 224 may sequentially output the first to fourth partial products PP1 to PP4, and the at least one adder 240 may generate the output OUT by sequentially accumulating the first to fourth partial products PP1 to PP4. The at least one adder 240 may have an arbitrary structure for summing the first to fourth partial products PP1 to PP4, and may include three adders, e.g. three adders comprising half-adder circuitry and/or full-adder circuitry in some example embodiments. Hereinafter, as shown in FIG. 2, an example of processing the 16-bit input IN[16:1] will be mainly described, but it will be understood that example embodiments are not limited thereto.

Figure 3:
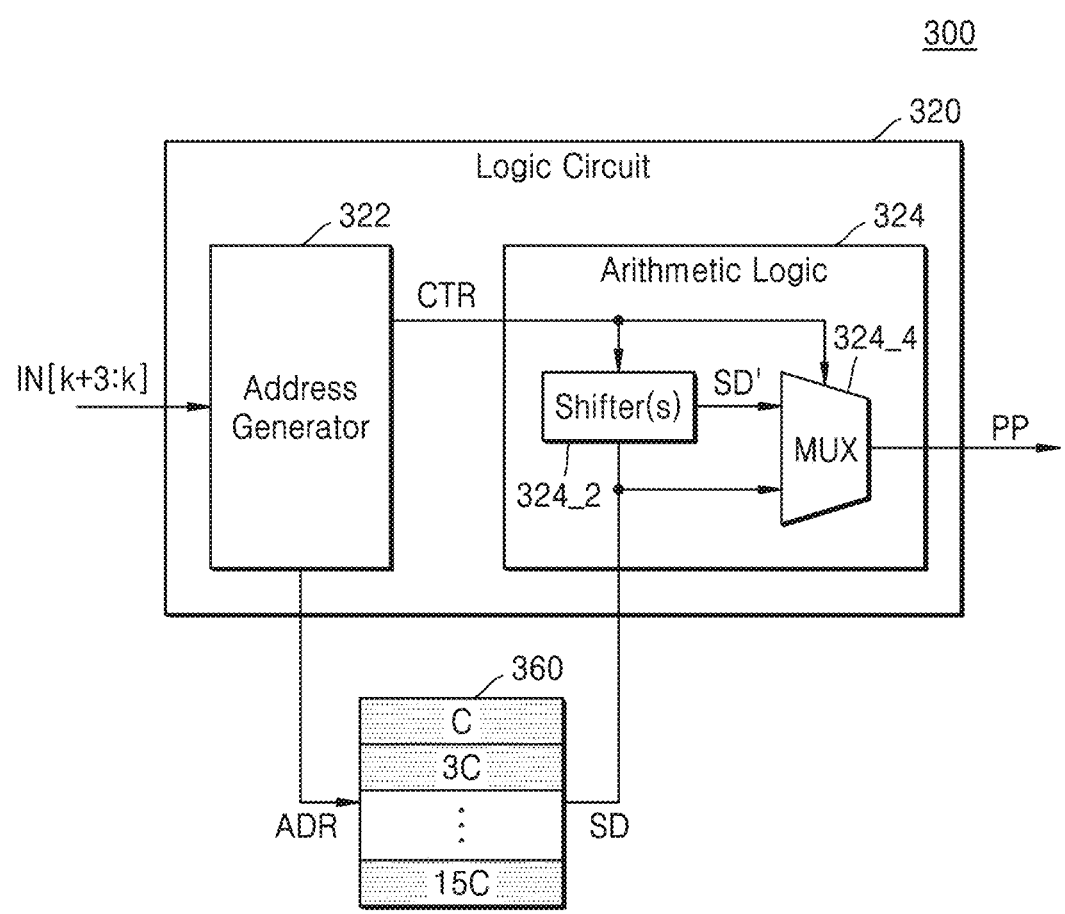

FIG. 3 is a block diagram illustrating an integrated circuit 300 according to some example embodiments. FIG. 4 is a diagram illustrating a table 400 including partial products generated by the integrated circuit 300 of FIG. 3 according to some example embodiments. Specifically, the block diagram of FIG. 3 shows a logic circuit 320 generating one partial product PP, and the table 400 of FIG. 4 shows how all possible values of the partial product PP are generated by the integrated circuit 300 of FIG. 3.

Referring to FIG. 3, the integrated circuit 300 may include a logic circuit 320 and a lookup table 360. The lookup table 360 may store seeds corresponding to odd multiples of the constant C, and may not store seeds corresponding to even multiples of the constant C. For example, as shown in FIG. 3, the lookup table 360 may store eight seeds 'C, 3C, . . . , 15C'. Accordingly, the lookup table 360 may not store all of the possible values of the partial product PP, and may store only half of 16 possible values of the partial product PP. As will be described later, when a part IN[k+3:k] is an odd number, the seed provided by the lookup table 360 in response to the address ADR may be output as the partial product PP, while when the part IN[k+3:k] is an even number, a value obtained by shifting the seed provided by the lookup table 360 at least one time in response to the address ADR may be output as the partial product PP.

The logic circuit 320 may receive the part IN[k+3:k] (k=1, 5, 9 or 13) of a certain length, e.g. a 4-bit length extracted from the input IN, and may generate the partial product PP. As shown in FIG. 3, the integrated circuit 300 may include an address generator 322 and arithmetic logic 324. The address generator 322 may generate the address ADR and the control signal CTR based on the part IN[k+3:k]. When the part IN[k+3:k] is an odd number, the address generator 322 may generate the address ADR indicating a location where a seed corresponding to the product of the part IN[k+3:k] and the constant C is stored. Alternatively, when the part IN[k+3:k] is an even number, the address generator 322 may generate the address ADR indicating a location where a seed capable of generating the partial product PP by a shift is stored.

The arithmetic logic 324 may include at least one shifter 324_2 and a multiplexer (MUX) 324_4. The at least one shifter 324_2 may generate a shifted seed SD' by shifting the seed SD received from the lookup table 360 based on the control signal CTR received from the address generator 322. The address generator 322 may determine the number of times to shift the seed SD when the part IN[k+3:k] is an even number, and may generate the control signal CTR based on the determined number of shifts.

The MUX 324_4 may select and output, as the partial product PP, either the seed SD provided from the lookup table 360 or the shifted seed SD' received from the at least one shifter 324_2 based on the control signal CTR received from the address generator 322. The address generator 322 may generate the control signal CTR for selecting the seed SD when the part IN[k+3:k] is an odd number, while when the part IN[k+3:k] is an even number, the address generator 322 may generate the control signal CTR for selecting the shifted seed SD'.

Referring to FIG. 4, the table 400 represents an operation for generating the partial product PP from the part IN[k+3:k], for example, an arithmetic operation and/or a bit shift operation. As described above with reference to FIG. 3, the lookup table 360 may store odd multiples of the constant C and may not store even multiples of the constant C, and accordingly, the partial product PP corresponding to the part IN[k+3:k] of the odd value may be same as the seed SD.

The partial product PP corresponding to the part IN[k+3:k] of the even value may be generated by shifting the seed SD at least one time. As used herein, the operation "<<" may be or may correspond to a shift operation, e.g. a bit shift operation. For example, a partial product '2C' may be generated by shifting/bit shifting the seed 'C' one time (C<<1), a partial product '12C' may be generated by shifting/bit shifting the seed '3C' twice (3C<<2), and a partial product '8C' may be generated by shifting/bit shifting the seed 'C' 3 times (C<<3). Accordingly, all 16 values of the partial product PP may be generated.

Figure 5:
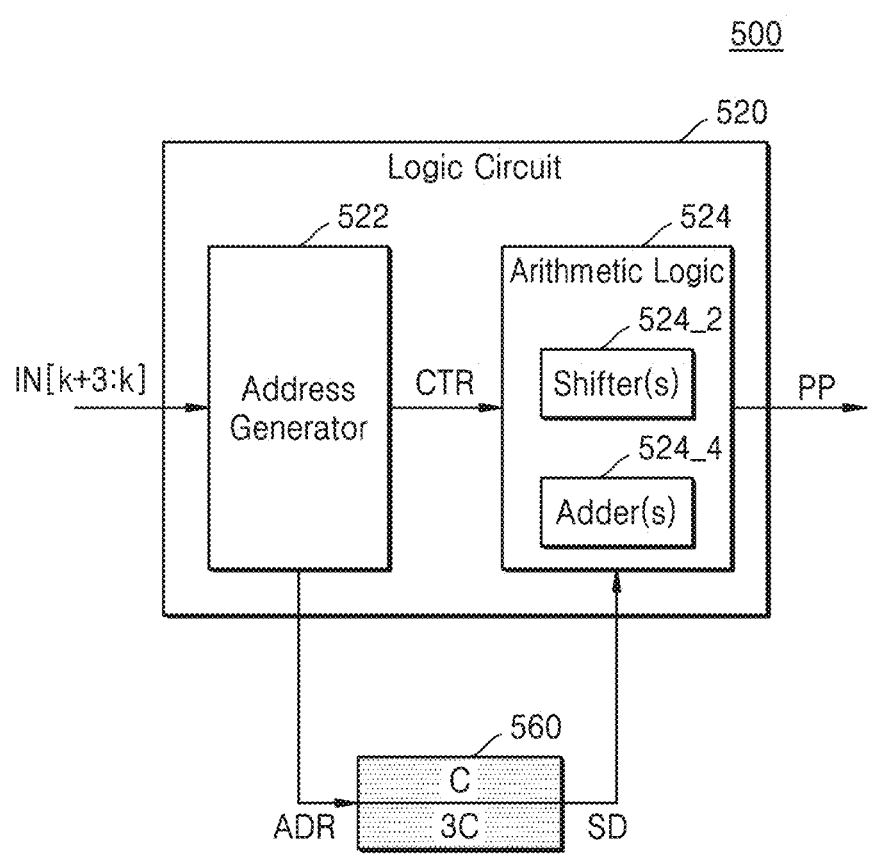

FIG. 5 is a block diagram illustrating an integrated circuit 500 according to some example embodiments. FIG. 6 is a diagram illustrating a table 600 including partial products generated by the integrated circuit 500 of FIG. 5 according to some example embodiments. In more detail, the block diagram of FIG. 5 shows a logic circuit 520 that generates one partial product PP, and the table 600 of FIG. 6 shows how all possible values of the partial product PP are generated by the integrated circuit 500.

Referring to FIG. 5, the integrated circuit 500 may include a logic circuit 520 and a lookup table 560. The lookup table 560 may store two or more seeds, and the partial product PP may be generated based on one or more operations on at least one seed. For example, as shown in FIG. 5, the lookup table 560 may store the two seeds 'C, 3C', and as will be described later, the partial product PP may be generated based on operation of at least one of the two seeds 'C, 3C'. The lookup table 560 of FIG. 5 may store a smaller number of seeds as compared to the lookup table 360 of FIG. 3, while the arithmetic logic 524 of FIG. 5 to be described later may further include at least one adder 524_4 when compared to the arithmetic logic 324 of FIG. 3. In some example embodiments, the lookup table 560 may store a small, e.g. a minimum number, of seeds such that the partial product PP is generated by one addition and/or at least one shift from at least one seed, as described below with reference to FIG. 6.

The logic circuit 520 may receive the part IN[k+3:k] having a 4-bit length extracted from the input IN, and may generate the partial product PP. As shown in FIG. 5, the logic circuit 520 may include an address generator 522 and arithmetic logic 524. The address generator 522 may generate the address ADR and the control signal CTR based on the part IN[k+3:k]. For example, the address generator 522 may generate the address ADR corresponding to one of the two seeds 'C, 3C' and may generate addresses corresponding to the one of two seeds 'C, 3C' (in parallel and/or sequentially), based on the part IN[k+3:k], as described later with reference to FIG. 6.

The arithmetic logic 524 may include at least one shifter 524_2 and at least one adder 524_4. The at least one shifter 524_2 may receive the seed SD provided from the lookup table 560 and/or may receive an output of the at least one adder 524_4 based on the control signal CTR, and may shift a received value. In addition, the at least one adder 524_4 may receive the seed SD provided from the lookup table 560 and/or may receive the output of the at least one shifter 524_2 based on the control signal CTR, and may add or subtract received values based on the control signal CTR. Herein, the at least one adder 524_4 included in the arithmetic logic 524 may be referred to as at least one second adder.

Referring to FIG. 6, the table 600 represents an operation for generating the partial product PP from the part IN[k+3:k], for example, an arithmetic operation and/or a bit shift operation. As described above with reference to FIG. 5, the lookup table 560 may store, e.g. may only store, the two seeds 'C, 3C', and accordingly, the partial product PP corresponding to the part IN[k+3:k], which is 1 or 3, may be same with the seed SD.

Some values of the partial product PP may be generated by shifting the seed SD. For example, as shown in FIG. 6, the four partial products '2C, 4C, 8C, 12C' may be generated by shifting one of the two seeds 'C, 3C', and no additional operation may be used to generate such partial products. Some values of the partial product PP may be generated by adding the seed SD and/or the shifted seed with the seed SD and/or the shifted seed. For example, a partial product '10C' may be generated by adding a value obtained by shifting the seed '3C' one time and a value obtained by shifting the seed 'C' twice. Some values of the partial product PP may be generated by subtracting the seed SD and/or the shifted seed from the seed SD and/or the shifted seed. For example, a partial product '15C' may be generated by subtracting the seed 'C' from a value obtained by shifting the seed 'C' four times. In some example embodiments, some values of partial product PP may be generated in a different manner from that shown in FIG. 6. For example, a partial product '9C' may be generated by adding a value obtained by shifting the seed '3C' one time and the seed '3C', differently from that shown in FIG. 6.

Figure 7:
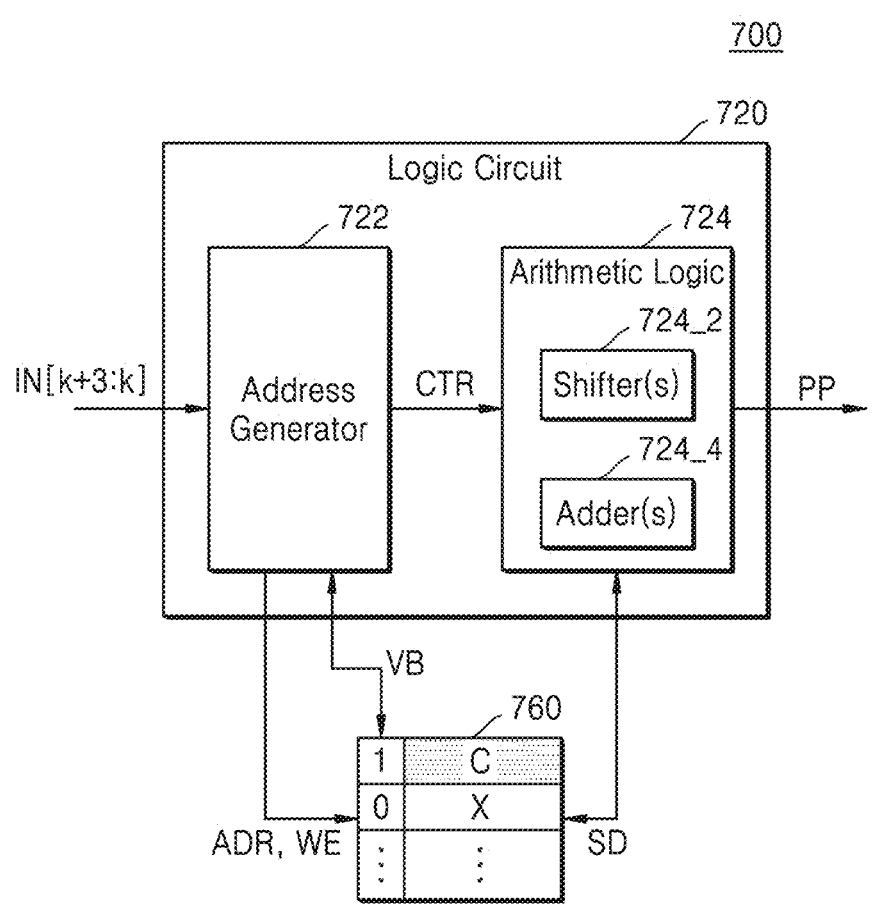
FIG. 7 is a block diagram illustrating an integrated circuit according to some example embodiments and FIG. 8 is a diagram illustrating an example of an operation of the integrated circuit of FIG. 7 according to some example embodiments.
Figure 8:
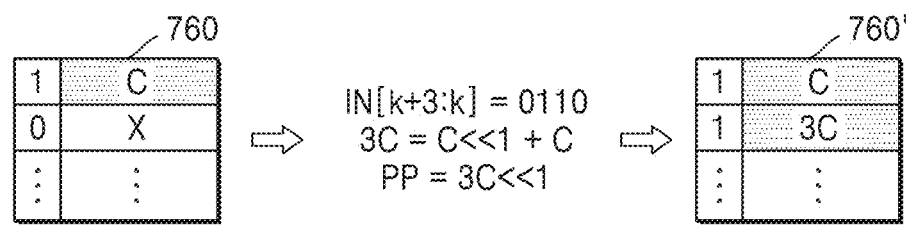

FIG. 7 is a block diagram illustrating an integrated circuit 700 according to some example embodiments and FIG. 8 is a diagram illustrating an example of an operation of the integrated circuit 700 of FIG. 7 according to some example embodiments. In more detail, the block diagram of FIG. 7 shows a logic circuit 720 for generating one partial product PP, and FIG. 8 shows an operation of updating a lookup table 760 by the logic circuit 720.

Referring to FIG. 7, the integrated circuit 700 may include the logic circuit 720 and the lookup table 760. The lookup table 760 may store not only seeds but also valid bits respectively corresponding to the seeds. An activated valid bit VB may indicate that the seed SD corresponding to the valid bit VB is valid, while an inactivated valid bit VB may indicate that the seed SD corresponding to the valid bit VB is invalid. For example, as shown in FIG. 7, in the lookup table 760, the activated valid bit VB corresponding to the constant C may be '1', while the inactivated valid bit VB corresponding to an invalid value X may be '0'. As used herein an activated valid bit VB may have a value of '1', while an inactivated valid bit VB may have a value of '0'; however, example embodiments are not limited thereto. For example, an activated valid bit VB may have a value of 'O', while an inactivated valid bit VB may have a value of '1'. In some example embodiments, the seed SD may be generated in a process of generating the partial product PP, and the generated seed SD may be stored in the lookup table 760, and thus, the valid bit VB may be activated. Referring to FIG. 8, when a part '0110' is received while the lookup table 760 stores the constant C, as shown in FIG. 8, '3C' may be generated by summing a value shifted from the seed 'C' and the seed 'C', and a partial product '6C' may be generated by shifting '3C'. For example '3C' generated in the process of generating the partial product PP may be used later as a seed, and accordingly, as shown in FIG. 8, an updated lookup table 760' may store the seed '3C' and '1' indicating the activated valid bit.

Referring back to FIG. 7, the logic circuit 720 may receive the part IN[k+3:k] having a 4-bit length extracted from the input IN, and calculate the partial product PP. As shown in FIG. 7, the logic circuit 720 may include an address generator 722, and arithmetic logic 724. The address generator 722 may generate the address ADR and the control signal CTR based on the part IN[k+3:k]. The address generator 722 may receive the valid bit VB corresponding to the address ADR, and may identify whether the seed SD is valid based on the valid bit VB. For example, when the valid bit VB is activated (e.g., has a value of '1'), the address generator 722 may identify that the seed SD received by the arithmetic logic 724 together with the valid bit VB is valid. Meanwhile, when the valid bit VB is inactivated (e.g., has a value of '0'), the address generator 722 may identify that the seed SD received by the arithmetic logic 724 together with the valid bit VB is invalid.

The address generator 722 may generate the control signal CTR such that the seed SD required for/used for generation of the partial product PP is generated by the arithmetic logic 724 in response to the inactivated valid bit VB. As shown in FIG. 7, the arithmetic logic 724 may provide the generated seed SD to the lookup table 760, and the address generator 722 may provide the address ADR and an activated write enable signal WE to the lookup table 760. Accordingly, the seed SD generated by the arithmetic logic 724 may be stored in the lookup table 760. Alternatively or additionally, the address generator 722 may provide not only the address ADR and the activated write enable signal WE, but also the activated valid bit VB to the lookup table 760, and accordingly, the seed SD stored in the lookup table 760 may be used later to generate the partial product PP from the part IN[k+3:k]. As a result, the seed SD may be generated and stored in the lookup table 760 when first used, and the stored seed SD may be used when generating the partial product PP later.

The arithmetic logic 724 may include at least one bit shifter 724_2 and at least one adder 724_4. The at least one shifter 724_2 may receive the seed SD provided from the lookup table 760 and/or an output of the at least one adder 724_4 based on the control signal CTR, and may shift a received value. In addition, the at least one adder 724_4 may receive the seed SD provided from the lookup table 760 and/or an output of the at least one shifter 724_2 based on the control signal CTR, and may add or subtract received values based on the control signal CTR. As described above, the at least one shifter 724_2 and the at least one adder 724_4 may be used to generate not only the partial product PP but also the seed SD that is first used.

Figure 9:
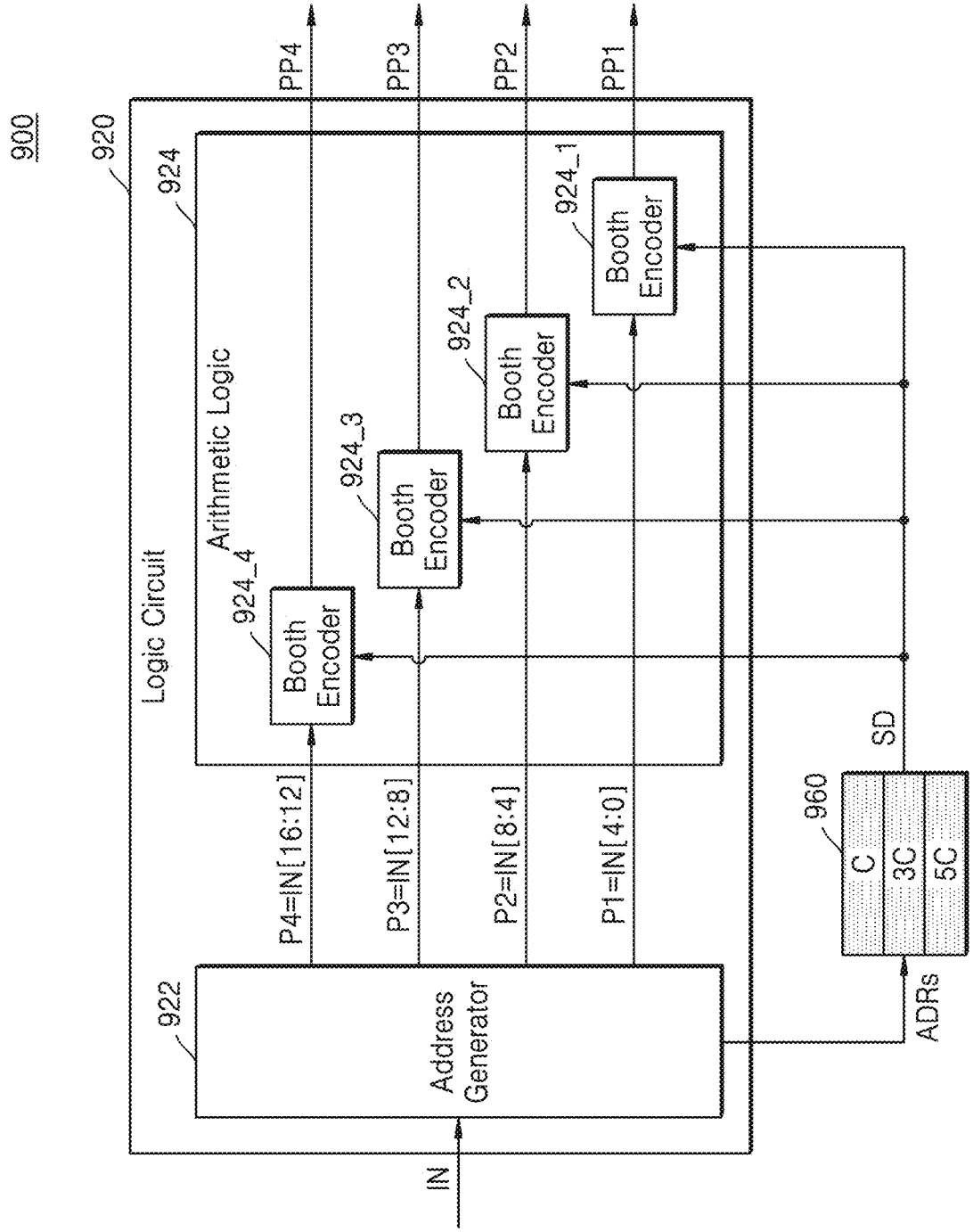
FIG. 9 is a block diagram illustrating an integrated circuit according to some example embodiments.

FIG. 9 is a block diagram illustrating an integrated circuit 900 according to some example embodiments. Specifically, the block diagram of FIG. 9 shows a logic circuit 920 that generates the first to fourth partial products PP1 to PP4 from the input IN. As shown in FIG. 9, the integrated circuit 900 may include the logic circuit 920 and a lookup table 960.

In some example embodiments, a partial product may be generated based on a Booth algorithm. The Booth algorithm may refer to a multiplication algorithm that provides a reduced amount of computations by encoding a multiplicand based on part of the multiplier and summing encoded multiplicands. The integrated circuit 900 may generate the first to fourth partial products PP1 to PP4 by encoding the constant C based on parts extracted from the input IN, as described later. The Booth algorithm may be based on a two's complement of the multiplicands.

Referring to FIG. 9, the logic circuit 920 may include an address generator 922 and an arithmetic logic 924. The address generator 922 may extract a plurality of parts from the input IN, and each of the plurality of parts may share at least one bit with another part for Booth encoding. For example, as shown in FIG. 9, the address generator 922 may extract the first to fourth parts P1 to P4 from the input IN based on a radix-10 Booth multiplication. The first part P1 may share a fourth bit IN[4] of the input IN with the second part P2, the second part P2 may share an eighth bit IN[8] of the input IN with the third part P3, and the third part P3 may share a 12th bit IN[12] of the input IN with the fourth part P4. Alternatively or additionally, the first part P1 may additionally include one bit IN[0] that is not included in the input IN. The address generator 922 may provide the first to fourth parts P1 to P4 to the arithmetic logic 924, and may generate a plurality of addresses ADRs based on a value of each of the first to fourth parts P1 to P4. As described above with reference to FIG. 2 and the like, the plurality of addresses ADRs may be simultaneously provided to the lookup table 960 in parallel or may be sequentially provided to the lookup table 960. As shown in FIG. 9, the lookup table 960 may store three seeds 'C, 3C, 5C', and, in response to each of the plurality of addresses ADRs, may output one of the three seeds 'C, 3C, 5C'.

The arithmetic logic 924 may include first to fourth Booth encoders 924_1 to 924_4, and the first to fourth Booth encoders 924_1 to 924_4 may respectively receive the first to fourth parts P1 to P4 from the address generator 922. Each of the first to fourth Booth encoders 924_1 to 924_4 may receive the seed SD from the lookup table 960, and may respectively generate the first to fourth partial products PP1 to PP4 from the first to fourth parts P1 to P4 based on the seed SD. According to the radix-10 Booth algorithm, the second Booth encoder 924_2 receiving the second part P2 may generate the second partial product PP2 by shifting the encoded value three times, the third Booth encoder 924_3 receiving the third part P3 may generate the third partial product PP3 by shifting the encoded value seven times, and the fourth Booth encoder 924_4 receiving the fourth part P4 may generate the fourth partial product PP4 by shifting the encoded value eleven times.

Figure 10:
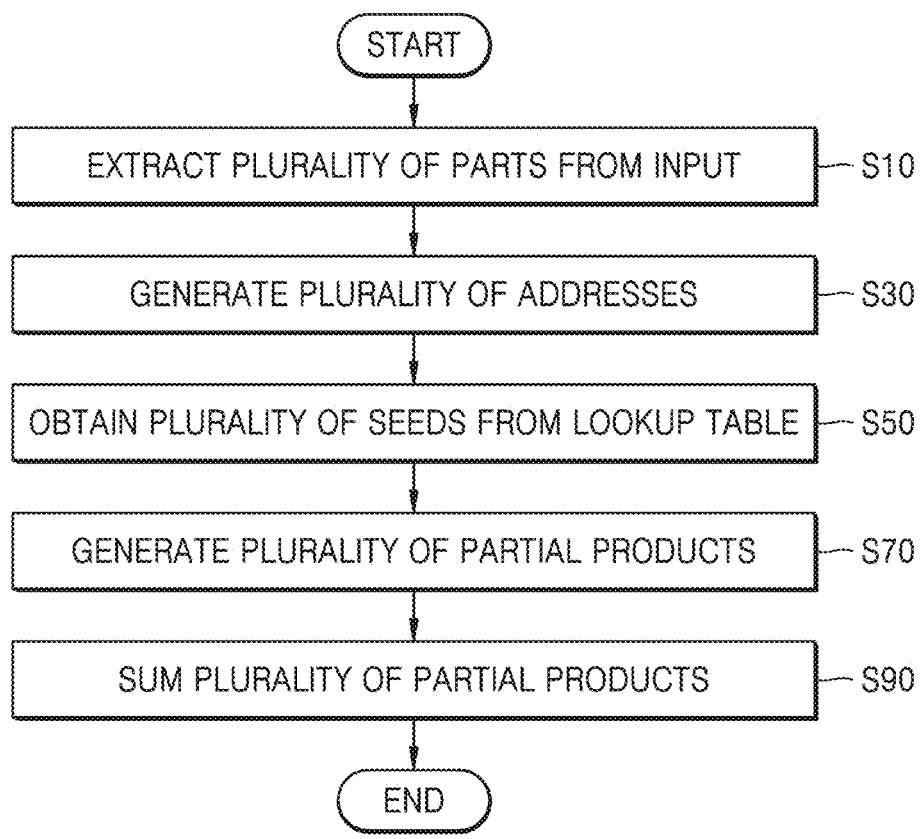
FIG. 10 is a flowchart illustrating a method for constant multiplication according to some example embodiments.

FIG. 10 is a flowchart illustrating a method for constant multiplication according to some example embodiments. As shown in FIG. 10, the method for constant multiplication may include a plurality of operations S10, S30, S50, S70, and S90. In some example embodiments, the method of FIG. 10 may be performed by the integrated circuit 200 of FIG. 2, and FIG. 10 will be described below with reference to FIG. 2.

Referring to FIG. 10, in operation S10, a plurality of parts may be extracted from the input IN. For example, the address generator 222 may receive the input IN having a 16-bit length and extract the first to fourth portions P1 to P4 from the input IN. The plurality of parts may be the same size, or may be different sizes.

In operation S30, the plurality of addresses ADRs may be generated. For example, the address generator 222 may generate the plurality of addresses ADRs based on the first to fourth parts P1 to P4. The address generator 222 may generate at least one address based on a part extracted from the input IN. Alternatively or additionally, the address generator 222 may generate the control signal CTR based on the first to fourth parts P1 to P4. In some example embodiments, the address generator 222 may not generate an address when the part extracted from the input IN is zero, and may generate the control signal CTR so that a corresponding partial product is zero.

In operation S50, a plurality of seeds SDs may be obtained from the lookup table 260. For example, the lookup table 260 may store seeds, and may concurrently or sequentially output the plurality of seeds SDs in response to the plurality of addresses ADRs received in parallel or sequentially from the address generator 222.

In operation S70, a plurality of partial products may be generated. For example, the arithmetic logic 224 may generate the plurality of partial products from the plurality of seeds SDs, for example, the first to fourth partial products PP1 to PP4, based on the control signal CTR provided from the address generator 222. The first to fourth partial products PP1 to PP4 may respectively correspond to values obtained by multiplying the first to fourth parts P1 to P4 by a constant. Due to the plurality of seeds SDs provided in operation S50, the first to fourth partial products PP1 to PP4 may be more easily generated based on a reduced amount of computations.

In operation S90, the plurality of partial products may be summed, e.g. may be accumulated. For example, the at least one adder 240 may receive the first to fourth partial products PP1 to PP4 from the arithmetic logic 224 and generate the output OUT by summing the first to fourth partial products PP1 to PP4.

Figure 11:
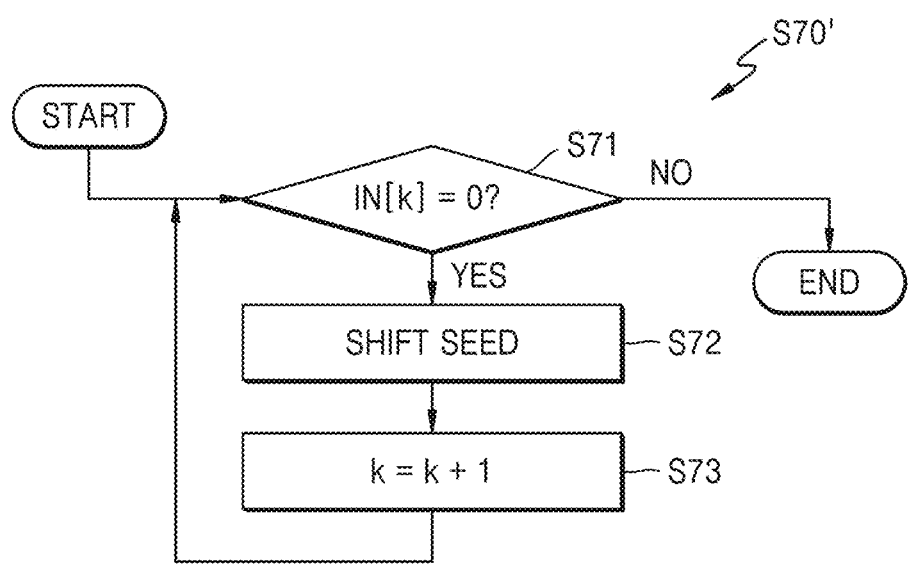
FIG. 11 is a flowchart illustrating a method for constant multiplication according to some example embodiments.

FIG. 11 is a flowchart illustrating a method for constant multiplication according to some example embodiments. Specifically, the flowchart of FIG. 11 shows an example of operation S70 of FIG. 10. As described above with reference to FIG. 10, a plurality of partial products may be generated in operation S70' of FIG. 11. As shown in FIG. 11, operation S70' may include a plurality of operations S71, S72, and S73. In some example embodiments, operation S70' may be performed by the integrated circuit 300 of FIG. 3, and FIG. 11 will be described below with reference to FIG. 3.

Referring to FIG. 11, in operation S71, a part extracted from the input IN may be determined to be an even number. For example, the address generator 322 may receive the part IN[k+3:k] having a 4-bit length extracted from the input IN, and may determine whether a least significant bit (LSB) of the part IN[k+3:k], e.g., a k-th bit IN[k] of the input IN, is zero. As described above with reference to FIGS. 3 and 4, the lookup table 360 may store odd multiples of the constant C, and the arithmetic logic 324 may receive the seed SD corresponding to odd multiples of the constant C from the lookup table 360. As shown in FIG. 11, when the part IN[k+3:k] is an odd number, e.g. has a least significant bit of '1', operation S70' may end, and the seed SD received from the lookup table 360 may be output as the partial product PP.

When the part IN[k+3:k] is an even number, e.g. has a '0' in the least significant bit, the seed SD may be shifted in operation S72. For example, when the part IN[k+3:k] is an even number, the address generator 322 may generate the control signal CTR so that the seed SD is shifted by the at least one shifter 324_2 of the arithmetic logic 324. The at least one shifter 324_2 may shift the seed SD in response to the control signal CTR.

In operation S73, an index k may be increased by 1, and operation S71 may be subsequently performed based on the increased index k. As described above with reference to FIG. 4, when the part IN[k+3:k] has a value corresponding to a multiple of 4 (e.g., 4C, 12C), the seed SD may be or be required to shift twice, and when the part IN[k+3:k] has a value corresponding to a multiple of 8 (e.g., 8C), the seed SD may be or be required to shift three times. Accordingly, as illustrated in FIG. 11, the seed SD may be shifted by the number of consecutive zeros from the LSB of the part IN[k+3:k]. For convenience of illustration, an example in which the seed SD is sequentially shifted is illustrated in FIG. 11, but in some example embodiments, the address generator 322 may identify the number of consecutive zeros from the LSB of the part IN[k+3:k] and generate the control signal CTR based on the identified number, and the at least one shifter 324_2 may shift the seed SD one or more times based on the control signal CTR.

Figure 12:
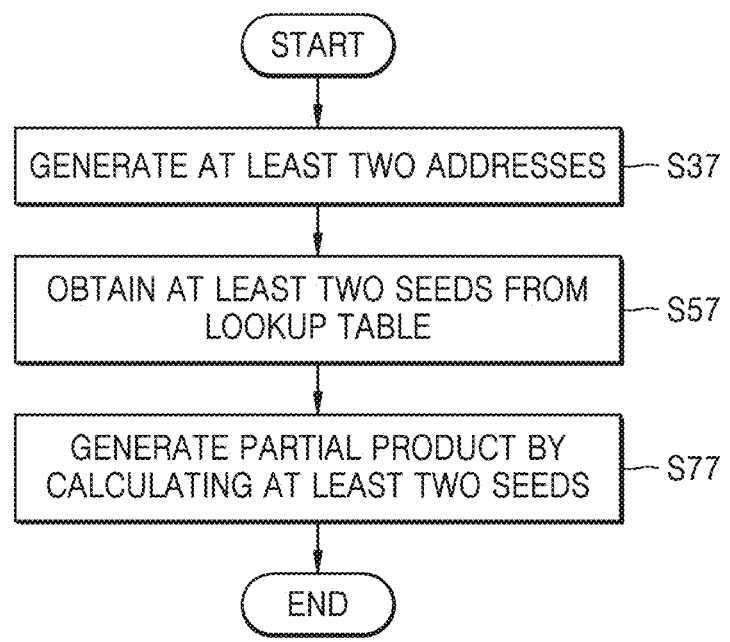
FIG. 12 is a flowchart illustrating a method for constant multiplication according to some example embodiments.

FIG. 12 is a flowchart illustrating a method for constant multiplication according to some example embodiments. Specifically, the flowchart of FIG. 12 shows the method of generating a partial product based on operation of two or more seeds. As shown in FIG. 12, the method for constant multiplication may include operation S37, operation S55, and operation S77, and operation S37, operation S57, and operation S77 may be included in operation S30, operation S50, and operation S70 of FIG. 9, respectively. In some example embodiments, the method of FIG. 12 may be performed by the integrated circuit 500 of FIG. 5, and FIG. 12 will be described below with reference to FIG. 5.

Referring to FIG. 12, at least two addresses may be generated in operation S37. For example, the address generator 522 may generate the at least two addresses based on a value of the part IN[k+3:k] extracted from the input IN. As described above with reference to FIG. 5, the lookup table 560 may store the seed 'C' and also the seed '3C', and the address generator 522 may generate the at least two addresses respectively corresponding to at least two seeds required to generate the partial product PP. For example, as described above with reference to FIG. 6, when the part '0101' is received, the address generator 522 may generate two addresses respectively corresponding to the seed 'C' and the seed '3C'.

In operation S57, the at least two seeds may be obtained from the lookup table 560. For example, the lookup table 560 may output the at least two seeds in response to the at least two addresses provided in operation S37, and the arithmetic logic 524 may receive the at least two seeds from the lookup table 560.

In operation S77, the partial product PP may be generated based on operation of the at least two seeds. For example, in operation S37, the address generator 522 may generate not only the at least two addresses but also the control signal CTR, and the arithmetic logic 524 may generate the partial product PP based on operation of the at least two seeds based on the control signal CTR provided from the address generator 522. The arithmetic logic 524 may include the at least one shifter 524_2 and the at least one adder 524_4, and as described above with reference to FIG. 6, may generate the partial product PP from the at least two seeds based on addition, subtraction, and/or shift.

Figure 13:
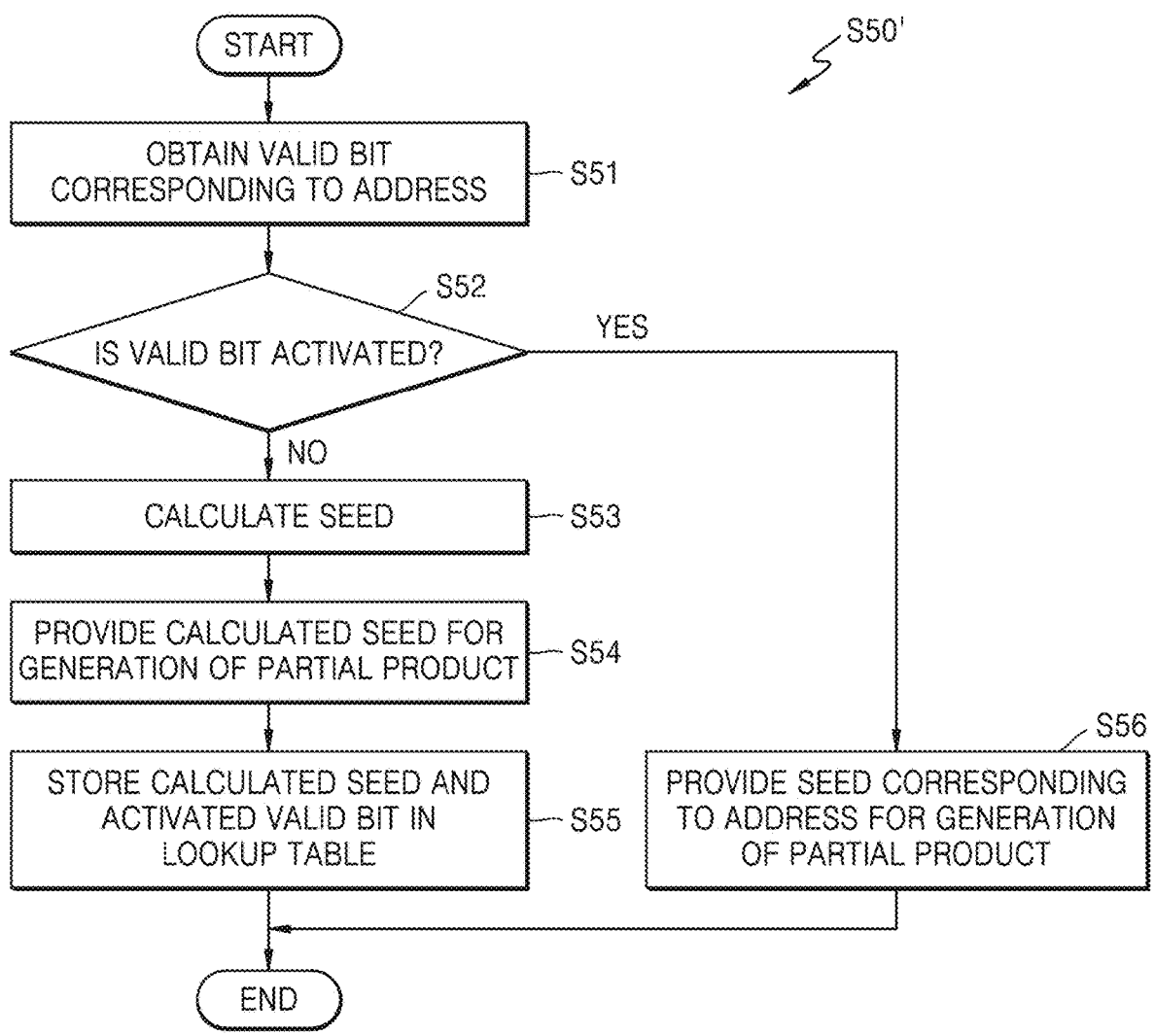
FIG. 13 is a flowchart illustrating a method for constant multiplication according to some example embodiments.

FIG. 13 is a flowchart illustrating a method for constant multiplication according to some example embodiments. Specifically, the flowchart of FIG. 13 shows an example of operation S50 of FIG. 10. As described above with reference to FIG. 10, a plurality of seeds may be obtained from a lookup table in operation S50' of FIG. 13. As shown in FIG. 13, operation S50' may include a plurality of operations S51 to S56. In some example embodiments, operation S50' may be performed by the integrated circuit 700 of FIG. 7, and FIG. 13 will be described below with reference to FIG. 7.

Referring to FIG. 13, in operation S51, the valid bit VB corresponding to the address ADR may be obtained. For example, the lookup table 760 may store seeds and valid bits respectively corresponding to the seeds, and each of the valid bits may indicate whether a seed corresponding to a valid bit is valid. The address generator 722 may receive the valid bit VB by providing the address ADR to the lookup table 760.

In operation S52, the valid bit VB may be determined whether to be activated. For example, the address generator 722 may determine that the valid bit VB is activated when a value of the valid bit VB received from the lookup table 760 is '1', while the address generator 722 may determine that the valid bit VB is inactivated when the value of the valid bit VB is '0'. As shown in FIG. 13, when the valid bit VB is activated, the seed SD corresponding to the address ADR may be provided for generation of the partial product PP in operation S56.

When the valid bit VB is inactivated, the seed SD may be calculated in operation S53. For example, as described above with reference to FIG. 8, the arithmetic logic 724 may generate the seed SD in a process of generating the partial product PP based on the control signal CTR provided from the address generator 722. Then, the seed SD calculated in operation S53 may be provided for the generation of the partial product PP in operation S54.

In operation S55, the calculated seed SD and the activated valid bit VB may be stored in the lookup table 760. For example, the arithmetic logic 724 may provide the seed SD calculated in operation S53 to the lookup table 760, and the address generator 722 may provide the activated valid bit VB and the activated write enable signal WE to the lookup table 760. The lookup table 760 may store the activated valid bit VB received from the address generator 722 and the seed SD received from the arithmetic logic 724 in response to the activated write enable signal WE.

Figure 14:
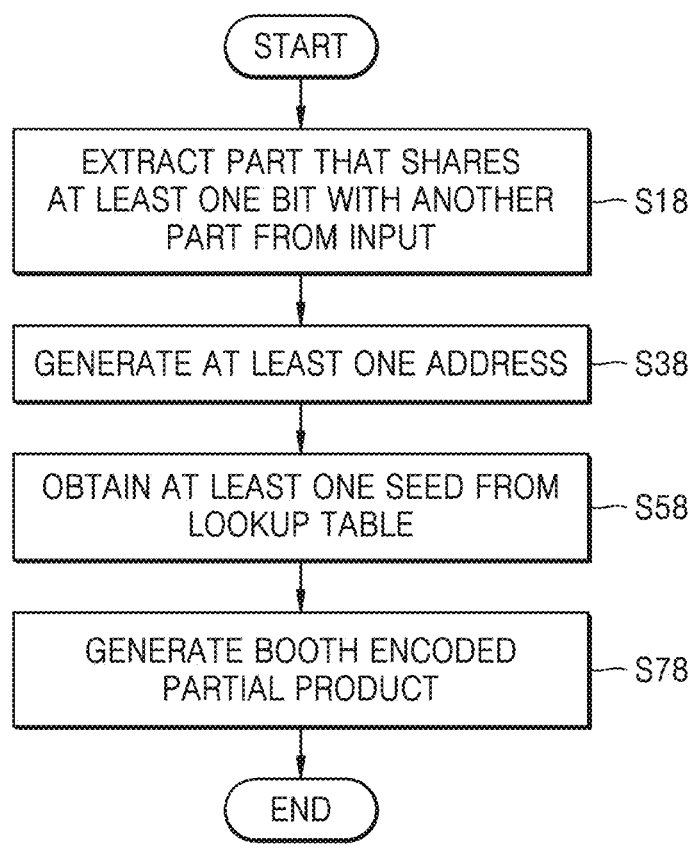
FIG. 14 is a flowchart illustrating a method for constant multiplication according to some example embodiments.

FIG. 14 is a flowchart illustrating a method for constant multiplication according to some example embodiments. Specifically, the flowchart of FIG. 14 shows a method of performing constant multiplication based on a Booth algorithm. As shown in FIG. 14, the method for constant multiplication may include operation S18, operation S38, operation S58 and operation S78, and operation S18, operation S38, operation S58 and operation S78 may be respectively included in operation S10, operation S30, operation S50, and operation S70 of FIG. 10. In some example embodiments, the method of FIG. 14 may be performed by the integrated circuit 900 of FIG. 9, and FIG. 14 will be described below with reference to FIG. 9.

Referring to FIG. 14, in operation S18, a part that shares at least one bit with another part may be extracted from the input IN. For example, the address generator 922 may extract the first to fourth parts P1 to P4 from the input IN, based on a radix-10 Booth multiplication, and each of the first to fourth parts P1 to P4 may share the at least one bit with another part.

In operation S38, at least one address may be generated. For example, the address generator 922 may generate the at least one address, in order to receive, from the lookup table 960, at least one seed required to generate a partial product based on the Booth multiplication from the part extracted in operation S18.

In operation S58, the at least one seed may be obtained from the lookup table 960. For example, the address generator 922 may provide the at least one address generated in operation S38 to the lookup table 960, and the lookup table 960 may provide the at least one seed to the arithmetic logic 924 in response to the at least one address.

In operation S78, a Booth encoded partial product may be generated. For example, the arithmetic logic 924 may include the first to fourth Booth encoders 924_1 to 924_4, and the first to fourth Booth encoders 924_1 to 924_4 may respectively generate the first to fourth partial products PP1 to PP4 from the first to fourth parts P1 to P4 based on the at least one seed provided in operation S58.

Figure 15:
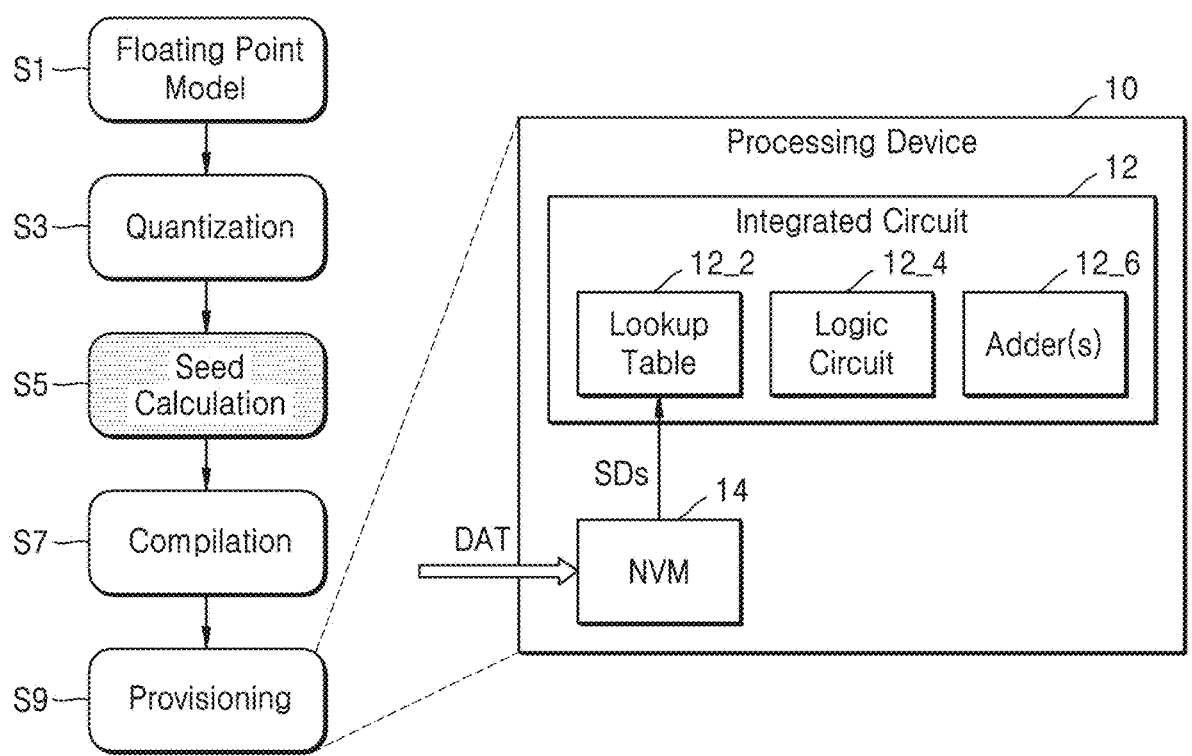
FIG. 15 is a diagram illustrating an example of an operation of storing seeds in a lookup table according to some example embodiments.

FIG. 15 is a diagram illustrating an example of an operation of storing seeds in the lookup table 12_2 according to some example embodiments. Specifically, the left side of FIG. 15 shows operations S1, S3, S5, S7, and S9 of mounting a machine learning model on a processing device 10 designed to execute the machine learning model, and the right side of FIG. 15 shows an example of operation S9 in detail.

The machine learning model may be or may refer to a model such as an arbitrary model trained by a plurality of samples. For example, the machine learning model may be a model based on at least one of an artificial neural network (ANN), a decision tree, a support vector machine, a regression analysis, a Bayesian network, a genetic algorithm, etc. In some example embodiments, when the machine learning model is based on an ANN (or simply a neural network), the ANN may include, as a non-limiting example, at least one of a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution Network, a deep belief network (DBN), restricted Boltzmann machine (RBM), a fully convolutional network, a long short-term memory (LSTM) network, and a classification network.

The processing device 10 may execute the machine learning model. For example, the processing device 10 may include dedicated hardware designed to execute a machine learning model, such as a neural processing unit (NPU), and may also include hardware for various purposes that may execute a machine learning model such as a central processing unit (CPU), a mining accelerator, a graphics processing unit (GPU), etc. Further, in some example embodiments, a processing device 10 may include a processor in memory (PIM) such as computational RAM. As shown in FIG. 15, the processing device 10 may include an integrated circuit 12 and a nonvolatile memory (NVM) 14, and the integrated circuit 12 may include a lookup table 12_2, a logic circuit 12_4, and at least one adder 12_6. In some example embodiments, the processing device 10 may include a plurality of cells, such as a plurality of standard cells, that in parallel generate products of inputs and weights included in a feature map, and each of the plurality of cells may include the lookup table 12_2, the logic circuit 12_4, and the at least one adder 12_6. Herein, the processing device 10 may be simply referred to as a device.

Referring to the left side of FIG. 15, a floating point model may be prepared in operation S1. For a more accurate result, a floating point model trained through floating point arithmetic instead of fixed point arithmetic may be prepared.

In operation S3, quantization may be performed. For example, the processing device 10 designed to execute the machine learning model may be included in a mobile system and may include limited resources. Accordingly, a floating point model may be quantized, and the quantized model may be installed on the processing device 10. As described above with reference to FIG. 1, the number of quantization levels may increase for a more accurate result.

In operation S5, a seed calculation may be performed. The floating point model that is completely trained in operation S1 may include floating point weights, and in operation S3, the floating point weights may be quantized. Seeds stored beforehand in the lookup table 12_2 may be used for multiplication of inputs and weights included in the feature map, as described above with reference to the drawings, and seeds to be stored in the lookup table 12_2 in operation S5 may be calculated. Because the weights are determined in operation S3, the seeds may be calculated a priori, e.g. beforehand in operation S5, independent of inference performed by executing the machine learning model by the processing device 10.

In operation S7, compilation may be performed. For example, a compiler executed by a computing system may convert the model quantized in operation S3 and the seeds calculated in operation S5 into a form executable by the processing device 10.

In operation S9, provisioning may be performed. For example, as shown on the right side of FIG. 15, data DAT compiled in operation S7 may be provisioned to the processing device 10. As described above, the data DAT may include the seeds calculated in operation S5. The data DAT provided to the processing device 10 may be programmed to the NVM 14, and the lookup table 12_2 may load seeds SDs from the NVM 14. As a result, some of operations required/used when a machine learning model is executed may be performed in advance, and inference of the machine learning model may be more efficiently performed.

Figure 16A:
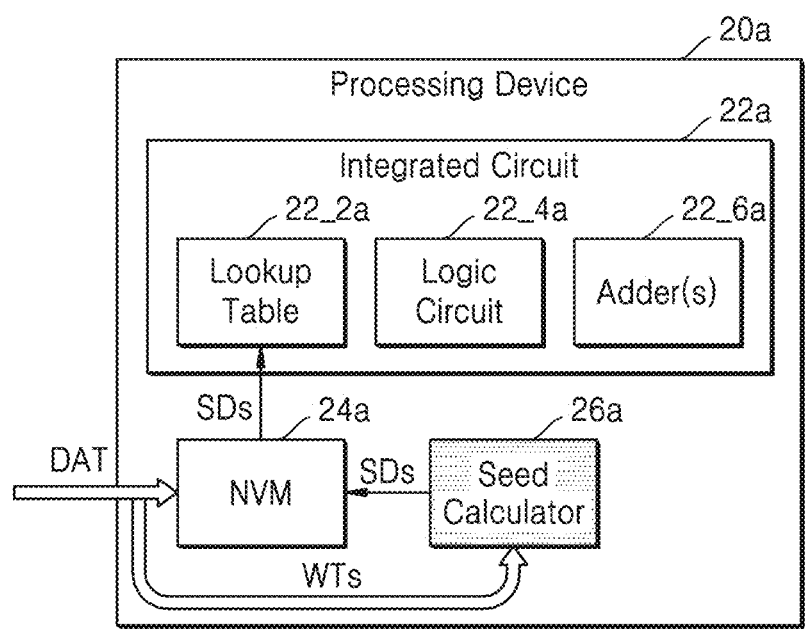
FIGS. 16A and 16B are block diagrams illustrating examples of an operation of storing seeds in lookup tables according to embodiments.
Figure 16B:
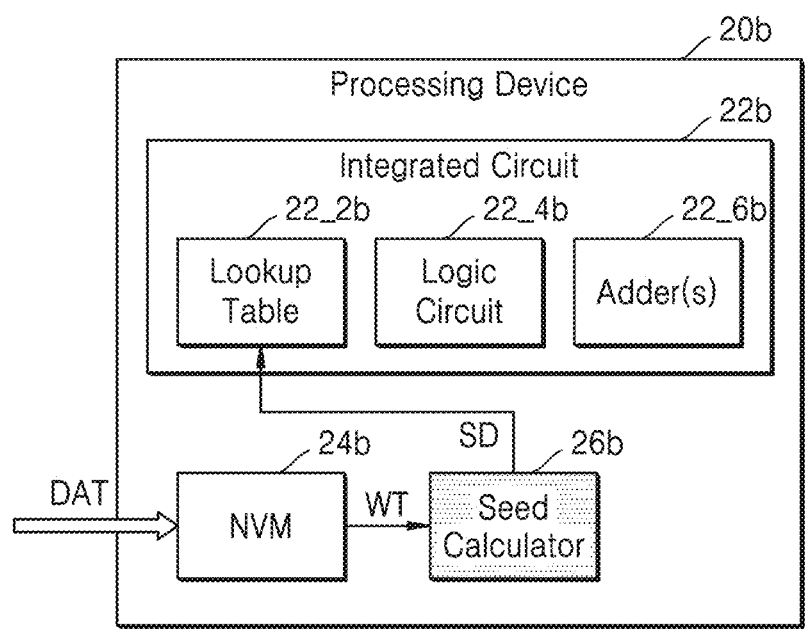

FIGS. 16A and 16B are block diagrams illustrating examples of an operation of storing seeds in lookup tables 22_2a and 22_2b according to embodiments. Unlike the example of FIG. 15, data compiled by a compiler may not include seeds, and seeds may be calculated by processing devices 20a and 20b of FIGS. 16A and 16B. Hereinafter, descriptions of FIGS. 16A and 16B redundant with that of FIG. 15 are omitted.

Referring to FIG. 16A, the processing device 20a may include an integrated circuit 22a, an NVM 24a, and a seed calculator 26a, and the integrated circuit 22a may include the lookup table 22_2a, a logic circuit 22_4a, and at least one adder 22_6a. As described above with reference to FIG. 15, in order to provision a machine learning model to the processing device 20a, the data DAT may be programmed in the NVM 24a.

The seed calculator 26a may receive a plurality of weights WTs from among the data DAT programmed in the NVM 24a, and generate the plurality of seeds SDs from the plurality of weights WTs. As shown in FIG. 16A, the seed calculator 26a may provide the plurality of seeds SDs to the NVM 24a, and the plurality of seeds SDs may be programmed to the NVM 24a together with the data DAT. Accordingly, the plurality of seeds SDs may be calculated when the machine learning model is provided, and the lookup table 22_2a may load the plurality of seeds SDs from the NVM 24a.

Referring to FIG. 16B, the processing device 20b may include an integrated circuit 22b, an NVM 24b, and a seed calculator 26b, and the integrated circuit 22b may include the lookup table 22_2b, a logic circuit 22_4b, and at least one adder 22_6b. As described above with reference to FIG. 15, in order to provision the machine learning model to the processing device 20b, the data DAT may be programmed in the NVM 24b.

The seed calculator 26b may receive the weight WT from the NVM 24b, and may calculate the seed SD from the weight WT to provide the seed SD to the lookup table 12_2b. Accordingly, different from the examples of FIGS. 15 and 16A, the seed SD may not be stored in the NVM 24b and the seed SD may be calculated from the weight WT by the seed calculator 26b and provided to the lookup table 12_2b before multiplication of an input by the weight WT is performed.

Figure 17:
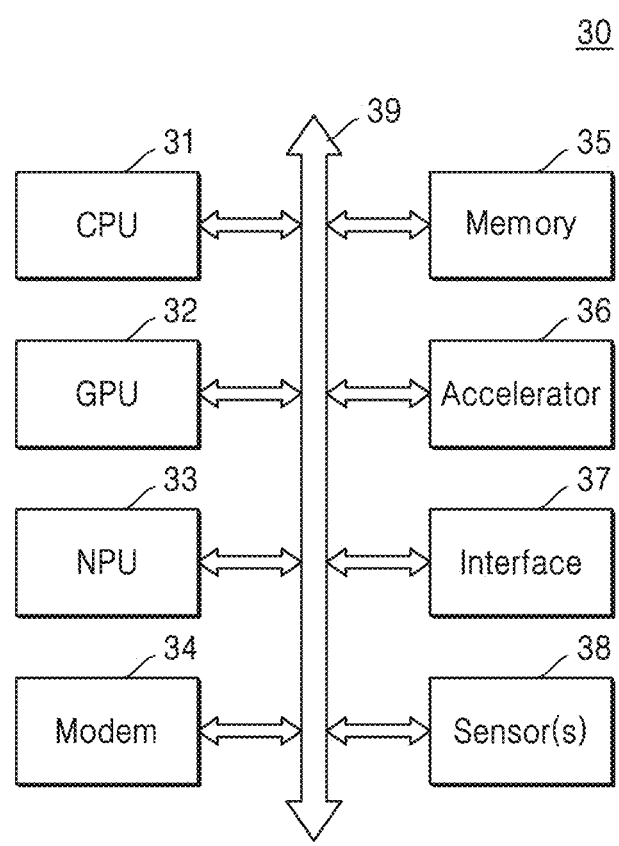
FIG. 17 is a block diagram illustrating a system according to some example embodiments.

FIG. 17 is a block diagram illustrating a system 30 according to some example embodiments. In some example embodiments, the system 30 may be a system-on-chip in which elements are integrated in one chip (or die), and may be referred to as an application processor (AP). As shown in FIG. 17, the system 30 may include a CPU 31, a GPU 32, an NPU 33, a modem 34, a memory 35, an accelerator 36, an interface 37, and at least one sensor 38, and the CPU 31, the GPU 32, the NPU 33, the modem 34, the memory 35, the accelerator 36, the interface 37 and the at least one sensor 38 may communicate with each other via a bus 39.

The CPU 31 may execute a series of instructions and control the system 30. In some example embodiments, the CPU 31 may execute an operating system (OS) and may execute a plurality of applications on the OS. The CPU 31 may include a plurality of cores capable of executing the instructions independently from each other, and may include a cache memory accessed by the plurality of cores. In some example embodiments, the CPU 31 may include circuitry such as an integrated circuit for constant multiplication described above with reference to the drawings.

The GPU 32 may refer to dedicated hardware designed to process graphic data, and the NPU 33 may refer to dedicated hardware designed to execute a machine learning model. In some example embodiments, the GPU 32 and/or the NPU 33 may include a plurality of cells operating in parallel with each other, and each of the plurality of cells may include an integrated circuit for constant multiplication described above with reference to the drawings.

The modem 34 may extract information by demodulating and/or decoding a signal received through a wired channel and/or a wireless channel. Further, the modem 34 may generate a signal to be transmitted over the wired channel or the wireless channel by encoding and/or modulating the information. The memory 35 may be accessed by other elements via the bus 39 and may include a volatile memory and/or an NVM. In some example embodiments, the memory 35 may store seeds to be loaded into a lookup table described above with reference to the drawings. The accelerator 36 may refer to hardware designed to perform a specific function at a high speed. The interface 37 may provide an interface with external devices of the system 30, for example, input/output devices. The at least one sensor 38 may sense or detect a physical quantity such as at least one of a temperature, voltage, current, etc.

As used herein variously described example embodiments are not necessarily mutually exclusive. For example, some example embodiments may include features described with reference to one figure, and may also include features described with reference to another figure.

Furthermore each of, or at least some of, the elements described above may be implemented as processing circuitry, e.g. may be implemented with logic gates such as standard cells comprising various transistors such as CMOS transistors. Elements may be designed as or implemented as standard cells such as full adders, half adders, multiplexers, decoders, encoders, etc.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts have been particularly shown and described with reference to various example embodiments thereof, it will be understood that various changes in form and details may be made therein without departing from the spirit and/or the scope of the following claims.

What is claimed is:

1. An integrated circuit for generating a product of an input multiplicand and a constant, the integrated circuit comprising:
   a lookup table memory configured to store seeds corresponding to multiples of the constant; and
   processing circuitry configured to generate a plurality of addresses respectively corresponding to a plurality of parts extracted from the input multiplicand, receive a plurality of seeds from the lookup table memory based on the plurality of addresses, and generate a plurality of partial products based on the plurality of seeds, wherein the processing circuitry is configured to sum the plurality of partial products to generate the product of the input multiplicand and the constant, and wherein a number of the seeds stored in the lookup table memory is less than a number of possible values of the plurality of partial products.

2. The integrated circuit of claim 1, wherein the lookup table memory is configured to store seeds corresponding to odd multiples of the constant, and the processing circuitry is configured to shift a seed received from the lookup table memory in response to a part extracted from the input multiplicand being an even number.

3. The integrated circuit of claim 1, wherein the processing circuitry is configured to generate at least two addresses based on a part extracted from the input multiplicand, receive at least two seeds from the lookup table memory based on the at least two addresses, and generate a partial product from the at least two seeds.

4. The integrated circuit of claim 3, wherein the lookup table memory is configured to store a first number of seeds such that the partial product is generated by at least one of one addition or at least one shift from at least one seed.

5. The integrated circuit of claim 3, wherein the processing circuitry is configured to perform at least one of an addition or a subtraction, the addition or subtraction based on the part extracted from the input multiplicand.

6. The integrated circuit of claim 1, wherein the lookup table memory is configured to store valid bits respectively corresponding to the seeds, and wherein the processing circuitry is configured to receive a first valid bit of a first seed based on an address corresponding to a part extracted from the input multiplicand, and in response to the first valid bit being inactivated, to generate the first seed, to store the generated first seed in the lookup table memory, and to store an activated first valid bit in the lookup table memory.

7. The integrated circuit of claim 1, wherein each of the plurality of parts extracted from the input multiplicand shares at least one bit with at least one other part of the plurality of parts, and the processing circuitry is configured to receive a part extracted from the input multiplicand and generate a partial product based on the seeds, the generating the partial product based on a Booth encoding.

8. The integrated circuit of claim 1, wherein the processing circuitry comprises:

a logic circuit configured to generate the plurality of addresses, receive the plurality of seeds from the lookup table memory based on the plurality of addresses, and generate the plurality of partial products based on the plurality of seeds; and at least one adder configured to sum the plurality of partial products.

9. A device comprising:

a plurality of cells configured to generate, in parallel, products of input multiplicands and weights, the weights included in a feature map, wherein each of the plurality of cells comprises:

a lookup table memory configured to store seeds corresponding to multiples of a weight; and processing circuitry configured to generate an address corresponding to a part extracted from an input multiplicand, and generate a partial product based on a seed corresponding to the address, wherein the processing circuitry is configured to generate a plurality of partial products based on a plurality of seeds and sum the plurality of partial products to generate a product of the input multiplicand and the weight, the plurality of partial products including the partial product, the plurality of seeds including the seed, and wherein a number of the seeds stored in the lookup table memory is less than a number of possible values of the partial product.

10. The device of claim 9, wherein the lookup table memory is configured to store seeds of odd multiples of the weights, and the processing circuitry is configured to generate the partial product by shifting the seed corresponding to the address in response to a part extracted from the input multiplicand being an even number.

11. The device of claim 9, wherein the processing circuitry is configured to generate at least two addresses based on a part extracted from the input multiplicand, and generate the partial product based on operation of at least two seeds corresponding to the at least two addresses.

12. The device of claim 9, wherein the lookup table memory is configured to store valid bits respectively corresponding to the seeds, and in response to a first valid bit of a first seed corresponding to the address being inactivated, the processing circuitry is configured to generate the first seed, and to store the generated first seed in the lookup table memory and to store an activated first valid bit in the lookup table memory.

13. The device of claim 9, wherein the processing circuitry is configured to extract parts that share at least one bit from the input multiplicand, and generate the partial product based on a Booth algorithm from a part extracted from the input multiplicand and the seeds.

14. The device of claim 9, wherein the processing circuitry is configured to calculate at least one seed from the weight.

15. The device of claim 14, further comprising:

a nonvolatile memory configured to store the weight and the calculated at least one seed, wherein the lookup table memory is configured to load the weight and the at least one seed from the nonvolatile memory.

16. The device of claim 14, wherein the processing circuitry is configured to transmit the calculated at least one seed to the lookup table memory before calculating a product.

17. A method of operating an integrated circuit for generating a product of an input multiplicand and of a constant, the integrated circuit including a lookup table memory and processing circuitry, the method comprising:

extracting, by the processing circuitry, a plurality of parts from the input multiplicand;

generating, by the processing circuitry, a plurality of addresses respectively corresponding to the plurality of parts;

obtaining, by the processing circuitry, a plurality of seeds from the lookup table memory configured to store seeds corresponding to multiples of the constant, the obtaining based on the plurality of addresses;

generating, by the processing circuitry, a plurality of partial products based on the plurality of seeds; and summing, by the processing circuitry, the plurality of partial products to generate the product of the input multiplicand and the constant, wherein a number of seeds stored in the lookup table memory is less than a number of possible values of the plurality of partial products.

18. The method of claim 17, wherein the lookup table memory is configured to store seeds corresponding to odd multiples of the constant, and The generating of the plurality of partial products comprises shifting a seed obtained from the lookup table memory when a part extracted from the input multiplicand is an even number.

19. The method of claim 17, wherein the generating of the plurality of addresses comprises generating at least two addresses based on a part extracted from the input multiplicand, the obtaining of the plurality of seeds comprises obtaining at least two seeds from the lookup table memory based on the at least two addresses, and the generating of the plurality of partial products comprises generating a partial product based on operation of the at least two seeds.

20. The method of claim 17, wherein the lookup table memory is configured to store valid bits respectively corresponding to the seeds, and wherein the obtaining of the plurality of seeds further comprises obtaining a first valid bit from the lookup table memory based on an address;

generating a first seed corresponding to the first valid bit when the first valid bit is inactivated; and storing the generated first seed and an activated first valid bit in the lookup table memory.

* * * * *